(12) United States Patent
Rowe, Jr.

(10) Patent No.: US 8,758,146 B2
(45) Date of Patent: Jun. 24, 2014

(54) COUPLING ELEMENT COOLING ARRANGMENT

(71) Applicant: Ingersoll-Rand Company, Montvale, NJ (US)

(72) Inventor: David F. Rowe, Jr., Clemmons, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 13/714,890

(22) Filed: Dec. 14, 2012

(65) Prior Publication Data

US 2013/0224047 A1    Aug. 29, 2013

Related U.S. Application Data

(63) Continuation of application No. 11/939,133, filed on Nov. 13, 2007, now Pat. No. 8,333,574.

(51) Int. Cl.
*F16D 1/00*        (2006.01)

(52) U.S. Cl.
USPC .............. 464/17; 417/319; 417/359; 417/360

(58) Field of Classification Search
USPC .............................. 417/319, 359, 360; 464/17
See application file for complete search history.

(56) References Cited

U.S. PATENT DOCUMENTS

| 2,730,877 A | | 1/1956 | Suberkrub | |
| 2,744,395 A | | 5/1956 | Massey et al. | |
| 3,365,913 A | | 1/1968 | Shields | |
| 3,678,708 A | | 7/1972 | Ernst et al. | |
| 3,727,431 A | * | 4/1973 | Yokel | 464/17 |
| 3,768,276 A | * | 10/1973 | Caldwell et al. | 464/17 |
| 4,678,070 A | | 7/1987 | Light | |
| 5,051,071 A | | 9/1991 | Haentjens | |
| 5,429,552 A | * | 7/1995 | Scherner et al. | 464/17 |

FOREIGN PATENT DOCUMENTS

| JP | 2005172110 A | 6/2005 |
| KR | 20020087718 A | 11/2002 |
| KR | 20050100741 A | 10/2005 |

* cited by examiner

*Primary Examiner* — Christopher Bobish
(74) *Attorney, Agent, or Firm* — Michael Best & Friedrich LLP

(57) ABSTRACT

A rotating system includes a drive member and a driven member. The rotating system includes a coupling positioned to rotatably couple the drive member to the driven member and a housing surrounding a portion of the coupling to define an inside and an outside, the housing having a plurality of apertures. A fan is coupled to the coupling and operable to produce a flow of air from the inside to the outside via at least one of the plurality of apertures, and a guide tube is positioned within one of the plurality of apertures to guide a flow of air from the outside to the inside.

20 Claims, 3 Drawing Sheets

COUPLING ELEMENT COOLING ARRANGMENT

RELATED APPLICATION DATA

The present application is a continuation of U.S. patent application Ser. No. 11/939,133 filed Nov. 13, 2007, now U.S. Pat. No. 8,333,574.

BACKGROUND

The present invention relates to a system for cooling a coupling element positioned between a drive member and a driven member. More specifically, the present invention relates to a cooling system for a flexible coupling positioned between a drive member and a driven member.

Couplings are generally employed between rotating equipment to connect them for rotation. The couplings allow different drive members to drive the different driven members without extensive modifications. In one example, an engine drives a compressor to produce a flow of compressed fluid.

Often, flexible couplings are employed to allow for slight misalignment of the shafts, to damp vibration (rotational and/or axial), or other operating conditions that may be problematic with a more rigid coupling. However, movement of the coupling to accommodate misalignment or vibration can produce heat. Air is sometimes directed to the coupling to reduce the operating temperature of the coupling. However, conventional methods sometimes direct less air to the coupling than desired, thereby allowing the coupling to operate at a temperature above a desired temperature. The increased operating temperature of the coupling can reduce the operating life of the coupling.

SUMMARY

In one embodiment, the invention provides a rotating system including a drive member and a driven member. The rotating system includes a coupling positioned to rotatably couple the drive member to the driven member and a housing surrounding a portion of the coupling to define an inside and an outside, the housing having a plurality of apertures. A fan is coupled to the coupling and operable to produce a flow of air from the inside to the outside via at least one of the plurality of apertures, and a guide tube is positioned within one of the plurality of apertures to guide a flow of air from the outside to the inside.

In another embodiment, the invention provides a rotating system that includes a drive member, a driven member, and a coupling operably positioned between the drive member and the driven member to rotatably couple the drive member to the driven member. A fan is operable to produce a low pressure region and to direct cooling air from the low pressure region to the coupling. A guide tube has a first end positioned to direct the cooling air to the second end positioned within the low pressure region.

In another embodiment the invention provides a rotating system that includes an engine, a compressor; and a flexible coupling positioned between the engine and the compressor to rotatably couple the engine and the compressor. A housing surrounds a portion of the coupling. The housing has a plurality of apertures. A fan is operable to produce a low pressure region and to direct cooling air from the low pressure region to the coupling. A guide tube has a first end positioned to direct the cooling air to the low pressure region. The guide tube extends through one of the plurality of apertures and is separate from the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
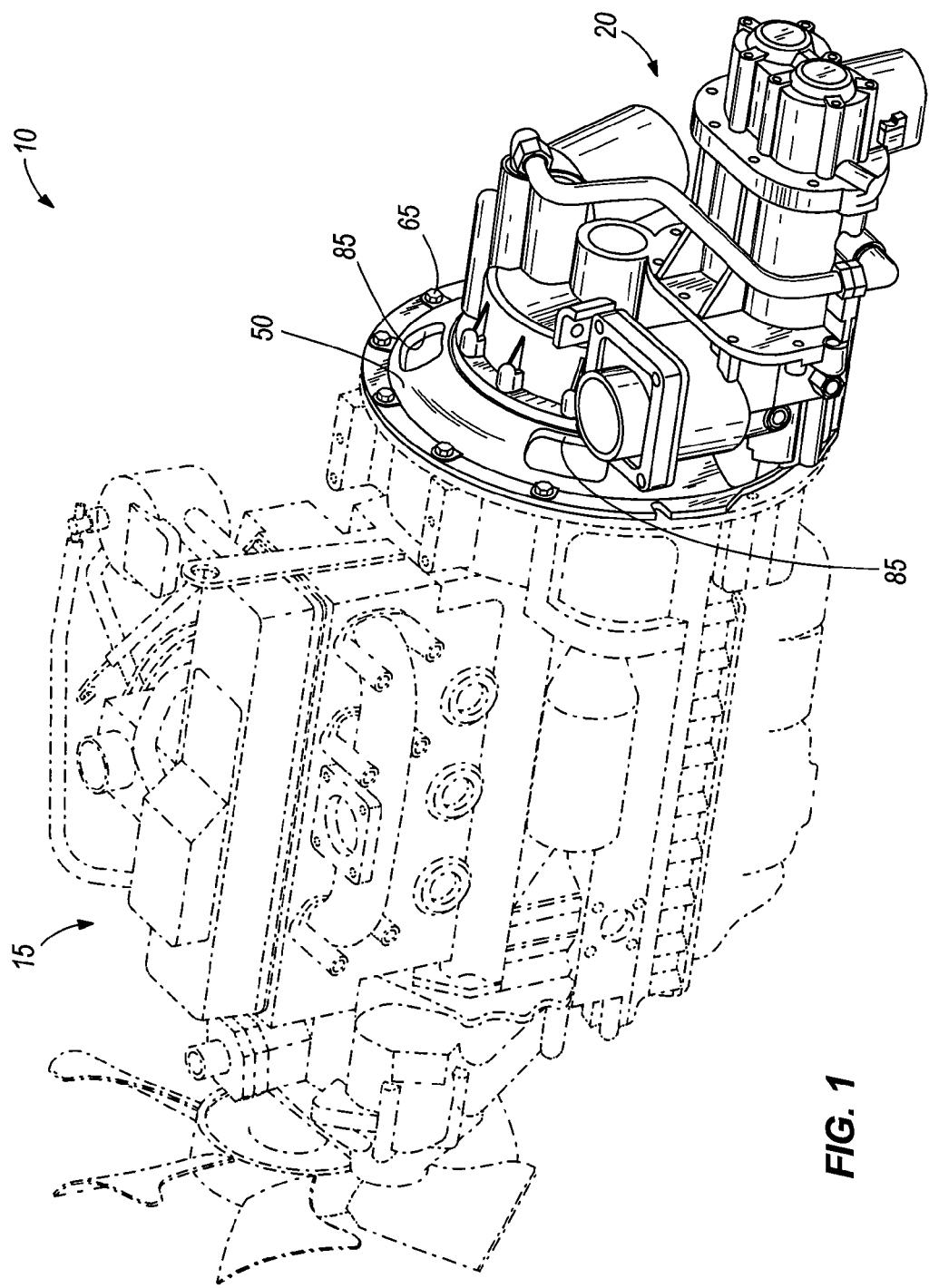
FIG. 1 is a perspective view of a compressor system embodying the invention.

FIG. 1 illustrates a compressor system 10 that includes a drive member 15, such as an engine, a driven member 20, such as a compressor, and a coupling 22 that connects the compressor 20 to the engine 15 such that the engine 15 drives the compressor 20. In the illustrated construction, the engine 15 includes an internal combustion engine or a diesel engine. However, other constructions may include other combustion engines such as rotary or radial engines, combustion turbine engines, and the like. In still other constructions, electric motors or other drive devices are employed. As such, the invention should not be limited by the type of drive member 15 employed so long as the drive member 15 includes a drive shaft 25 (shown in FIG. 2).

The engine 15 also includes an engine mounting face 30 positioned adjacent the drive shaft 25 and sized to allow for attachment of the driven member 20. In the illustrated construction, the engine mounting face 30 includes a substantially planar circular surface having a plurality of apertures 35 formed therein.

The driven member 20 can include a number of devices such as but not limited to a compressor, a pump, or a generator. In the illustrated construction, the driven member 20 includes a rotary screw compressor. Of course other types of compressors (e.g., centrifugal, scroll, reciprocating, etc.) could be employed if desired.

The compressor 20 includes a substantially stationary housing 40 that supports one or more moving elements disposed within the housing 40. In the case of the rotary screw compressor 20, the moving elements include a pair of intermeshing screw members. One of the screw members is driven by a shaft 45 (shown in FIG. 2) that extends from the housing 40.

The compressor 20 also includes a bell housing 50 that is attached to, or is formed as part of the compressor housing 40.

The bell housing 50 includes a compressor mounting face 55 disposed around the shaft 45. The compressor mounting face 55 is a circular substantially planar surface that includes a plurality of apertures 60. The mounting face 55 is arranged to allow the bell housing 50 to engage the engine mounting face 30 to connect the bell housing 50 and the compressor 20 to the engine 15. A plurality of bolts 65 pass through the apertures 60 in the compressor mounting face 55 and threadably engage the apertures 35 in the engine mounting face 30 to attach the stationary portion of the compressor 20 to the stationary portion of the engine 15.

Figure 2:
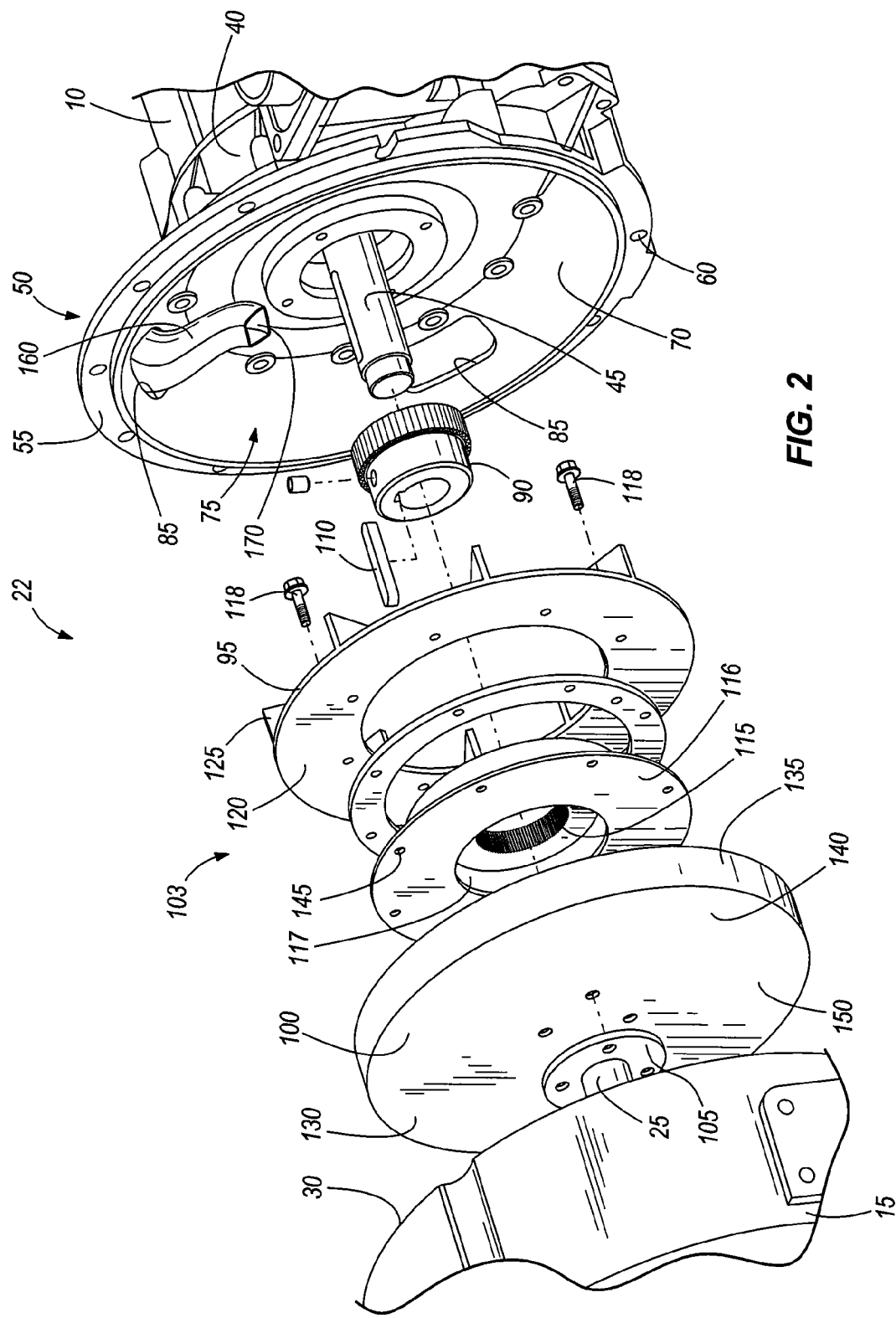
FIG. 2 is an exploded perspective view of a portion of the compressor system of FIG. 1.

With reference to FIG. 2, the bell housing 50 includes a wall 70 that separates an inside 75 or coupling space, from an outside 80 and defines a plurality of apertures 85 that extend through the wall 70 to provide for fluid flow between the inside 75 and the outside 80. In the illustrated construction, four substantially rectangular apertures 85 are formed through the wall 70 with other shapes or quantities of apertures also being possible. The compressor mounting face 55 is positioned at a large diameter end of the wall 70.

As noted, the wall 70 of the bell housing 50 is shaped such that the bell housing 50 cooperates with the engine to define the coupling space (the inside 75). The coupling 22 is disposed within the space 75 such that the bell housing 50 covers the coupling 22 and inhibits access to the rotating components between the engine 15 and the compressor 20.

Figure 3:
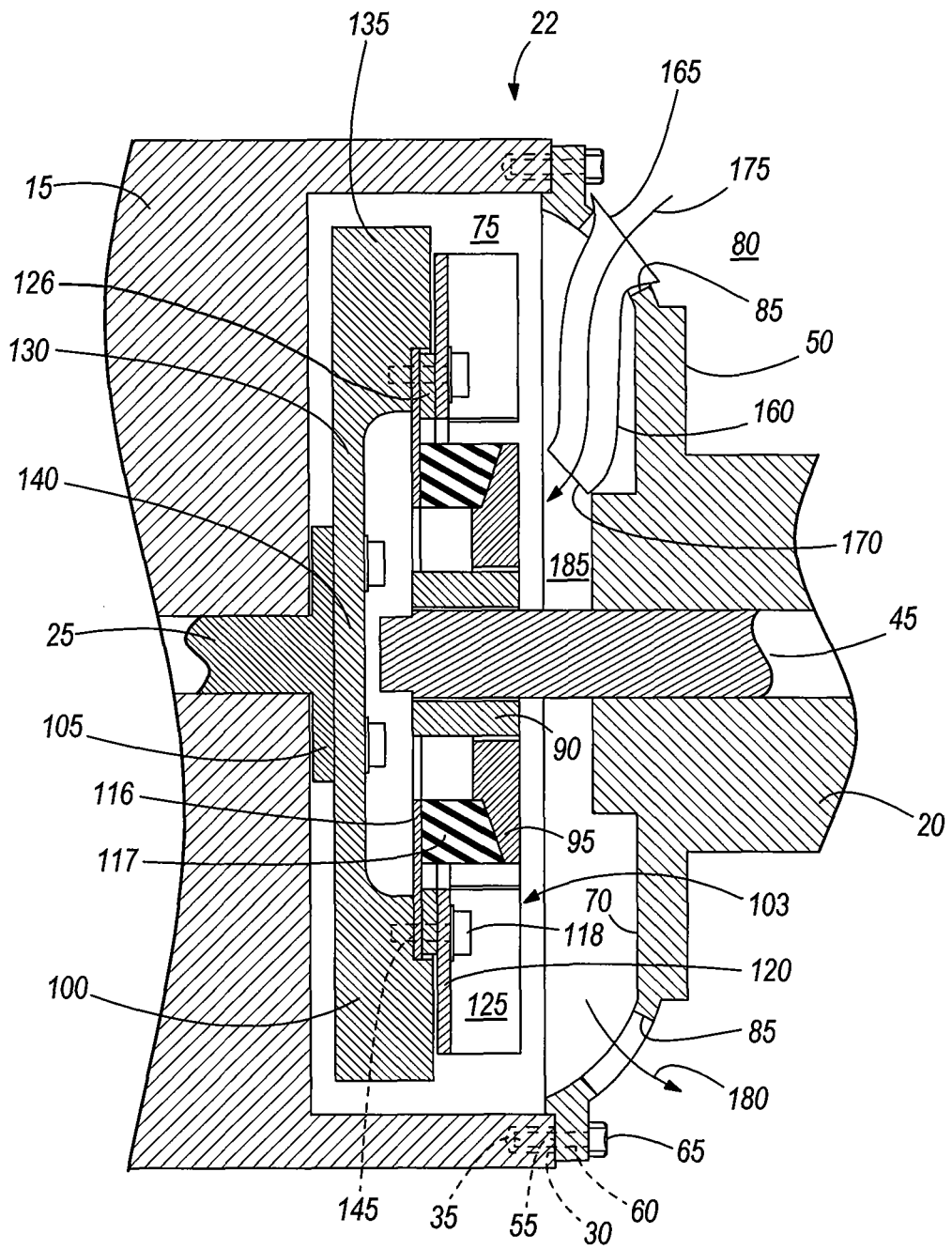
FIG. 3 is a schematic cross-section of a portion of the compressor system of FIG. 1.

With reference to FIGS. 2 and 3, the coupling 22 includes a gear 90, a coupling member 95, a flywheel 100, a fan 103, and a drive plate 105. The illustrated gear 90 is a spur gear that is fixedly attached to the compressor shaft 45. In the illustrated construction, a key 110 is used to rotationally couple the gear 90 and the shaft 45. Of course, other constructions could employ other systems to rotationally couple the gear 90 and the shaft 45. It should be noted that while a spur gear 90 is illustrated in FIGS. 2 and 3, other constructions could employ a spline or other arrangement if desired.

The coupling member 95 includes a gear portion 115 that defines an inner aperture shaped to receive the gear 90 such that the gear 90 and the coupling member 95 are rotationally coupled. However, the engagement between the gear 90 and the gear portion 115 allows for relative axial movement of the coupling member 95 with respect to the gear 90 and the compressor 20. The coupling member 95 also includes a plate portion 116 that connects to the gear portion using a flexible portion 117. The plate portion includes a plurality of apertures that are sized and positioned to receive bolts 118 that facilitate the attachment of the coupling member 95 to the flywheel 100. The flexible portion 117 is preferably formed from a resilient material such as rubber to allow the coupling to absorb vibrations and flex as required.

The fan 103 includes a disk portion 120 that supports a plurality of vanes 125. The vanes 125 are arranged to produce air movement when rotated. Specifically, the vanes 125 are arranged to draw air from the inner most diameter of the vanes 125 and discharge the air to the outermost portion of the vanes 125. A spacer 126 is positioned between the disk portion 120 and the plate portion 116 to position the fan 103 as desired.

The flywheel 100 includes a disk portion 130 that supports a weighted portion 135. The flywheel 100 also includes an engine attachment portion 140 and a fan attachment portion 145 that engages the disk portion 120 of the fan 103 to fixedly attach the fan 103 to the flywheel 100.

The engine attachment portion 140 includes a plurality of apertures 150 arranged to engage the drive plate 105 that is fixedly attached to the drive shaft 25. Thus, the flywheel 100 is fixedly attached to the drive shaft 25 and flexibly engaged to the coupling member 95. The coupling member 95 is rotationally coupled to the gear 90 but is free to move axially with respect to the gear 90 and the gear 90 is fixedly attached to the compressor shaft 45 to complete the coupling 22.

Before proceeding, it should be noted that the illustrated coupling 22 is one possible coupling arrangement with many other coupling arrangements being possible. The invention described herein is suitable for use with virtually any coupling 22 that uses a coupling member 95 and that is disposed within the coupling space 75.

With continued reference to FIGS. 2 and 3, the compressor system 10 also includes a guide tube 160 positioned in one of the apertures 85 formed in the wall 70 of the bell housing 50. The guide tube 160 defines an inlet 165 positioned outside of the bell housing 50 and an outlet 170 positioned adjacent the innermost diameter of the vanes 125. The guide tube 160 is shaped to engage the wall 70 of the bell housing 50.

With the guide tube 160 positioned as illustrated in FIGS. 2 and 3, the guide tube 160 defines a flow path 175 that provides for the passage of air from the outside 80 to the inside 75. The apertures 85 that do not include a guide tube 160 define a second flow path 180 from the inside 75 to the outside 80.

In the illustrated construction, the guide tube 160 is simply positioned within the aperture 85. However, other constructions may include a restraining member that holds the guide tube 160 in the desired position. Still other constructions may employ welding, soldering, brazing, adhesives, and the like to affix the guide tube 160 to the bell housing 50.

While the illustrated construction includes a single guide tube 160, other constructions may employ two guide tubes 160 or more than two guide tubes 160 as may be desired. The guide tube 160 can be formed from any suitable material with plastic or metal being preferred.

In operation, the engine 15 combusts a fuel to produce shaft power at the drive shaft 25. The drive shaft 25 in turn rotates the flywheel 100 which is fixedly coupled to the drive shaft 25. The flywheel 100 provides rotational inertia that reduces pulsations in the drive shaft 25 caused by the uneven application of power provided by the engine 15.

The gear 90 engages the gear portion 115 formed as part of, or attached to the coupling member 95 to rotationally couple the gear 90 to the coupling member 95. The gear 90 remains free to move axially with respect to the coupling member 95. The gear 90 is fixedly attached to the driven shaft 45 such that rotation of the gear 90 produces a corresponding rotation of the driven shaft 45.

Rotation of the fan 103 produces a low pressure region 185 near the innermost portion of the vanes 125 as air is pulled from this region by the fan 103 and discharged from the bell housing 50 via the apertures 85. To improve the effectiveness of the fan 103, cool air from outside of the bell housing 50 is introduced to this low pressure region 185 inside of the bell housing 50 using the guide tube 160. The inlet 165 of the guide tube 160 is positioned outside of the bell housing 50 in a region where the air pressure is approximately equal to atmospheric pressure. The outlet 170 of the guide tube 160 is positioned near the innermost portion of the vanes 125 where rotation of the fan 103 produces the low pressure region 185. Thus, the fan 103 draws cool air from outside of the bell housing 50 into the coupling space 75 to improve cooling of the coupling 22. The remaining apertures 85 remain open to allow for the discharge of air from the coupling space 75 during fan operation.

Thus, the invention allows for the efficient introduction of cool air into the coupling space 75. The fan 103 then directs the cool air over the coupling 22 to improve cooling of the coupling 22 and reduce the operating temperature of the coupling 22.

Various features and advantages of the invention are set forth in the following claims.

What is claimed is:

1. A rotating system including a drive member and a driven member that rotate about an axis, the rotating system comprising:
   a coupling positioned to rotatably couple the drive member to the driven member;
   a housing surrounding a portion of the coupling to define an inside and an outside, the
   housing having a plurality of substantially identical outlet apertures each spaced a substantially equal distance from the axis and arranged to direct air out of the housing;
   a fan coupled to the coupling and operable to produce a flow of air from the inside to the outside; and
   a guide tube positioned within one of the plurality of outlet apertures to guide a flow of air produced by the fan from the outside to the inside, such that the guide tube converts the one of the plurality of outlet apertures into an inlet aperture such that cooling air flows into the inside of the housing through the outlet aperture that contains the flow tube, cools the coupling, and flows from the inside to the outside of the housing through each of the outlet apertures that do not contain the flow tube, wherein operation of the fan produces a low pressure region and wherein the guide tube includes a first end disposed within the low pressure region and a second end disposed adjacent the one of the plurality of outlet apertures.

2. The rotating system of claim 1, wherein the guide tube is separate from the housing.

3. The rotating system of claim 1, wherein the guide tube sealably engages the housing to inhibit airflow through the aperture between the guide tube and the housing.

4. The rotating system of claim 1, wherein the fan includes a plurality of vanes that produce a low pressure region in response to rotation.

5. The rotating system of claim 4, wherein the guide tube includes a first end in fluid communication with the outside and a second end in fluid communication with the low pressure region to produce a flow of air from the first end to the second end in response to rotation of the fan.

6. The rotating system of claim 1, wherein the coupling comprises a polymer.

7. The rotating system of claim 1, wherein the coupling comprises rubber.

8. The rotating system of claim 1, wherein the coupling is a flexible coupling.

9. The rotating system of claim 1, further comprising a second guide tube positioned in a second of the plurality of apertures.

10. The rotating system of claim 1, wherein the outlet apertures are the sole apertures into and out of the housing.

11. A rotating system including a drive member and a driven member that rotate about an axis, the rotating system comprising:
    a coupling positioned to rotatably couple the drive member to the driven member;
    a housing surrounding a portion of the coupling to define an inside and an outside, the
    housing having a plurality of substantially identical outlet apertures each spaced a substantially equal distance from the axis and arranged to direct air out of the housing;
    a fan coupled to the coupling and operable to produce a flow of air from the inside to the outside; and
    a guide tube positioned within one of the plurality of outlet apertures to guide a flow of air produced by the fan from the outside to the inside, such that the guide tube converts the one of the plurality of outlet apertures into an inlet aperture such that cooling air flows into the inside of the housing through the outlet aperture that contains the flow tube, cools the coupling, and flows from the inside to the outside of the housing through each of the outlet apertures that do not contain the flow tube, wherein the fan includes a plurality of vanes and wherein the first end of the guide tube is disposed between the vanes and the axis.

12. The rotating system of claim 11, wherein the guide tube is separate from the housing.

13. The rotating system of claim 11, wherein the guide tube sealably engages the housing to inhibit airflow through the aperture between the guide tube and the housing.

14. The rotating system of claim 11, wherein the fan includes a plurality of vanes that produce a low pressure region in response to rotation.

15. The rotating system of claim 14, wherein the guide tube includes a first end in fluid communication with the outside and a second end in fluid communication with the low pressure region to produce a flow of air from the first end to the second end in response to rotation of the fan.

16. The rotating system of claim 11, wherein the coupling comprises a polymer.

17. The rotating system of claim 11, wherein the coupling comprises rubber.

18. The rotating system of claim 11, wherein the coupling is a flexible coupling.

19. The rotating system of claim 11, further comprising a second guide tube positioned in a second of the plurality of apertures.

20. The rotating system of claim 11, wherein the outlet apertures are the sole apertures into and out of the housing.

* * * * *